United States Patent [19]

Blackwell et al.

[11] Patent Number: 5,173,837
[45] Date of Patent: Dec. 22, 1992

[54] HINGE WITH TWO-TOWED CLUTCH SPRING FOR SUPPRESSING ELECTROMAGNETIC INTERFERENCE FOR LAPTOP PERSONAL COMPUTERS

[75] Inventors: Sam D. Blackwell, Tomball; Drew D. Granzow, Spring, both of Tex.

[73] Assignee: Compaq Computer Corporation, Houston, Tex.

[21] Appl. No.: 597,858

[22] Filed: Oct. 15, 1990

[51] Int. Cl.⁵ .......................... H05K 7/16; H05K 9/00; E05D 11/00; H01R 39/00
[52] U.S. Cl. .................................. 361/380; 361/424; 439/31; 439/179; 16/342
[58] Field of Search .................. 439/5, 13, 18, 23, 25, 439/28, 29, 30, 31, 179; 16/342, 337; 248/291, 920, 922, 923; 364/708; 361/380, 392, 393, 394, 395, 399, 212, 220, 424

[56] References Cited

U.S. PATENT DOCUMENTS

| | | | |
|---|---|---|---|
| 253,366 | 2/1882 | Garber | 439/13 X |
| 2,895,033 | 7/1959 | Favre | 439/31 X |
| 3,355,695 | 11/1967 | Overesch | 439/31 |
| 3,860,312 | 1/1975 | Gordon, Jr. | 439/31 |
| 4,040,696 | 8/1977 | Wada et al. | 439/23 |
| 4,755,143 | 7/1988 | Enomoto et al. | 439/31 |
| 4,842,525 | 6/1989 | Galloway et al. | 439/13 X |
| 4,865,553 | 9/1989 | Tanigawa et al. | 439/13 X |
| 4,904,189 | 2/1990 | Hallings | 439/13 |
| 4,960,256 | 10/1990 | Chihara et al. | 248/291 |
| 4,964,015 | 10/1990 | Crooken et al. | 439/13 X |
| 4,976,007 | 12/1990 | Lain | 16/342 X |
| 4,989,813 | 2/1991 | Kim et al. | 248/920 X |
| 4,995,579 | 2/1991 | Kitamura | 16/337 X |
| 5,010,983 | 4/1991 | Kitamura | 16/342 X |
| 5,013,224 | 5/1991 | Liao | 439/18 X |
| 5,018,244 | 5/1991 | Hino | 16/342 |

*Primary Examiner*—Leo P. Picard
*Assistant Examiner*—Michael W. Phillips
*Attorney, Agent, or Firm*—James R. Burdett

[57] ABSTRACT

A laptop personal computer system according to this invention comprises a base unit including a microcomputer subsystem, a cover unit including a display subsystem, a hinge unit for coupling the cover unit to the base unit, the hinge unit having a clutch spring to control torque from opening or closing the cover unit, and conductive elements cooperatively coupled within the hinge unit for suppressing electromagnetic interference in operations of the microcomputer subsystem.

10 Claims, 2 Drawing Sheets

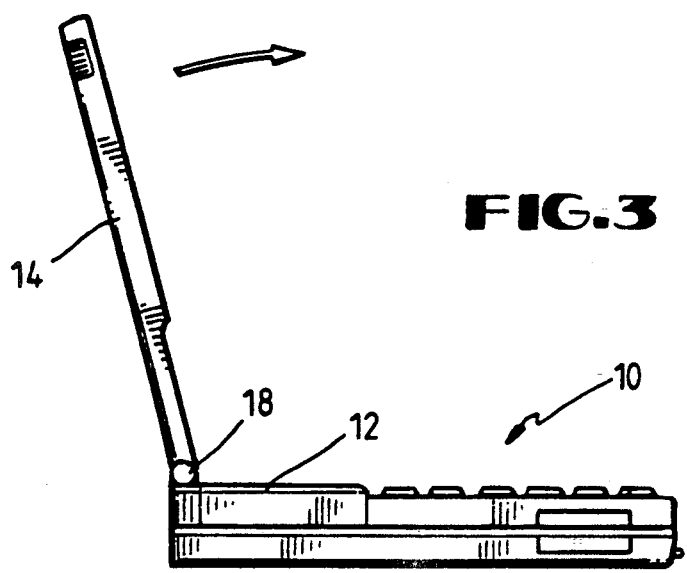
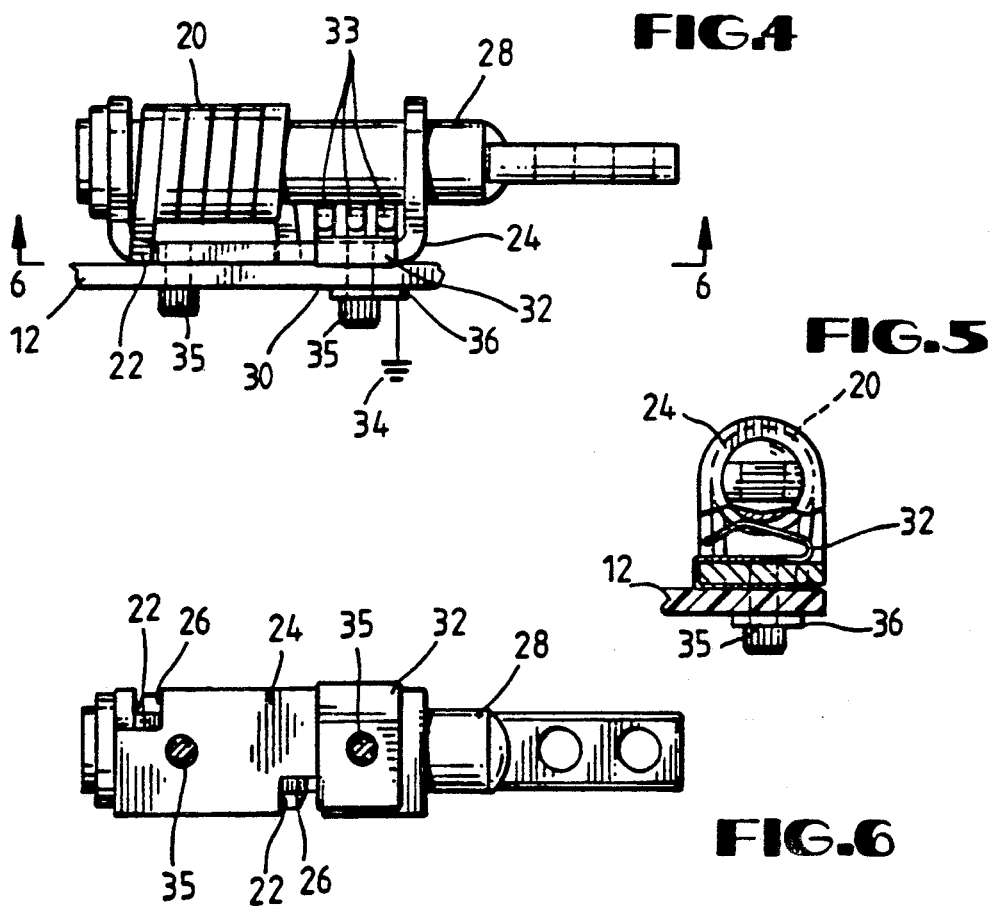

HINGE WITH TWO-TOWED CLUTCH SPRING FOR SUPPRESSING ELECTROMAGNETIC INTERFERENCE FOR LAPTOP PERSONAL COMPUTERS

BACKGROUND OF THE INVENTION

1. Field of the Invention

This invention relates generally to laptop personal computers, and more particularly to a clutch spring for such laptop personal computers having the ability to suppress electromagnetic interference (EMI).

2. Statement of the Prior Art

In the recent past, laptop personal computers such as the COMPAQ LTE and COMPAQ LTE/286 Personal Computers manufactured by the assignee of this invention, have gained widespread popularity. A laptop personal computer, because of its small size, low weight, and ability to operate for extended periods of time on nickel cadmium (NiCad) battery packs, enables a user to maximize his productivity by providing a highly portable computing system. Many laptop personal computers are no larger than about 8 ½ inches (21.6 centimeters) deep by about 11 inches (27.9 centimeters) wide, and they are sometimes no heavier than about 6 to 7 pounds (about 3 kilograms).

Covers for laptop personal computers typically incorporate a display which, in conjunction with the microcomputer used, causes electromagnetic interference (EMI). In order to suppress the EMI in the past, prior art laptop personal computers have employed a braided cable which was connected to a grounded location, such as the chassis or ground plane of the microcomputer's "motherboard". As can be expected, braided cable is relatively heavy as compared to the other components of a laptop personal computer. Therefore, it would be desirable not only to suppress EMI but also to reduce the overall weight of the machine.

Compared to the CGA display subsystems used in laptop personal computers of the prior art, newer VGA display subsystems encompass a greater expanse of their respective cover units. The COMPAQ LTE 386s/20 Personal Computer which is manufactured by the assignee of this invention, for example, takes up about 50 percent more of the cover unit with its VGA display than the CGA display of predecessor COMPAQ LTE and COMPAQ LTE/286 Personal Computers. Moreover, the VGA displays often are more flexible than CGA displays, and thereby require more careful control of the torque that is placed upon them during opening and closing of the cover unit. It would further be desirable, therefore, to control such torque while suppressing EMI and reducing the overall weight of a laptop personal computer.

SUMMARY OF THE INVENTION

A laptop personal computer system according to this invention comprises a base unit including a microcomputer subsystem, a cover unit including a display subsystem, hinge means for coupling the cover unit to the base unit, the hinge means having a clutch spring to control opening and closing torque during opening or closing the cover unit and conductive means cooperatively coupled to the clutch spring, for suppressing electromagnetic interference in operations of the microcomputer and display subsystems.

The clutch spring, preferably a two-toed clutch spring, is coupled to a clutch bracket/clutch shaft or hinge pin assembly which together comprise the hinge means. Situated between the clutch shaft and the clutch bracket in one embodiment according to this invention is the conductive EMI suppressing means, generally comprising an electrically conductive spring-form metal providing a conductive path for the EMI generated in the cover unit to ground. A first part of the spring-form metal is attached to the chassis, or the ground plane of the microcomputer subsystem, while a second part of the spring-form metal is attached, between the clutch bracket and the clutch shaft, and then to the first part. The first and second metal parts may comprise a suitably conductive metal (e.g., copper) and preferably comprise beryllium-copper plated with tin. Alternatively, or in addition to the first and second metal parts, a conductive lubricant may be applied to the clutch shaft, between the clutch bracket and clutch shaft, and thereby provide a path to ground.

Other objects, advantages, and novel ideas according to this invention will become readily apparent from the following detailed description thereof, when it is considered in conjunction with the accompanying drawings wherein:

BRIEF DESCRIPTION OF THE DRAWINGS

FIG. 3 is a side view, taken along the lines 3—3 of the laptop personal computer in FIG. 2;

FIG. 4 is a front view of the clutch assembly that illustrates in greater detail the clutch spring according to present invention;

FIG. 5 is a side view, taken along the lines 5—5 of the clutch assembly in FIG. 4; and FIG. 6 is a bottom plan view, taken along the lines 6—6 of the clutch assembly in FIG. 4.

DETAILED DESCRIPTION OF THE INVENTION

Figure 1:
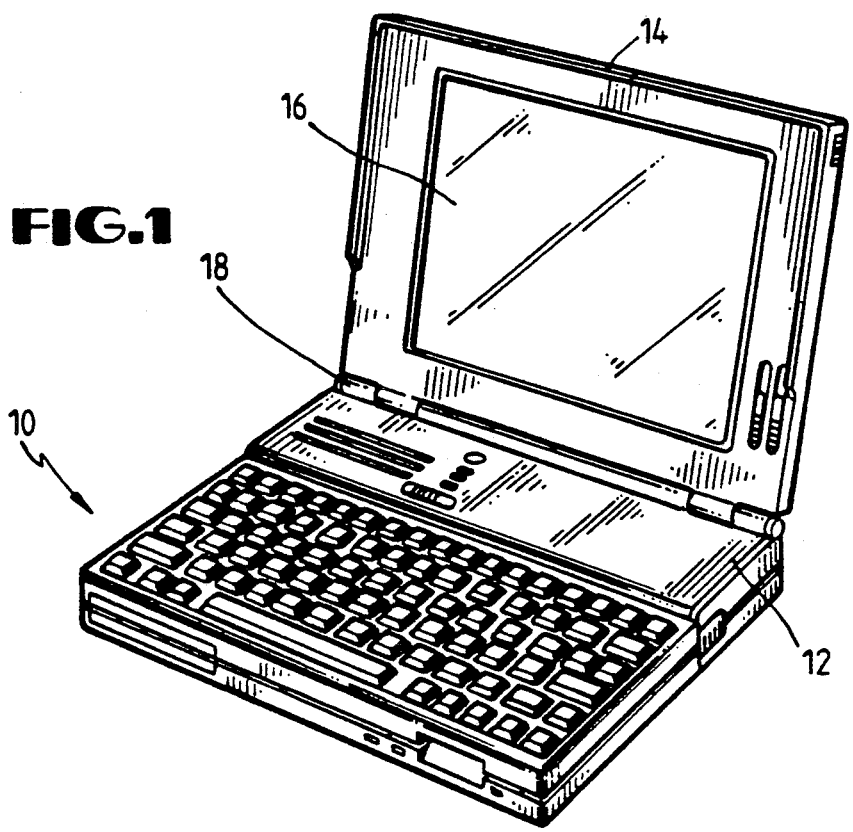
FIG. 1 is an orthogonal view of a laptop personal computer that incorporates a clutch spring according to the present invention.

Referring now to the drawings, wherein like numbers designate like or corresponding parts throughout the several views, there is shown in FIG. 1 a laptop personal computer system 10 having a base unit 12 and a cover unit 14. The base unit 12 has a microcomputer subsystem which is conventional and, therefore, not shown, and the cover unit 14 has a display subsystem 16 (e.g., a conventional VGA display). Hinge means 18 are employed to couple the cover unit 14 to the base unit 12 in the manner, recognized by those of ordinary skill in the art, as employed in the COMPAQ LTE and COMPAQ LTE/286 personal computers manufactured by the assignee of this invention.

Figure 2:
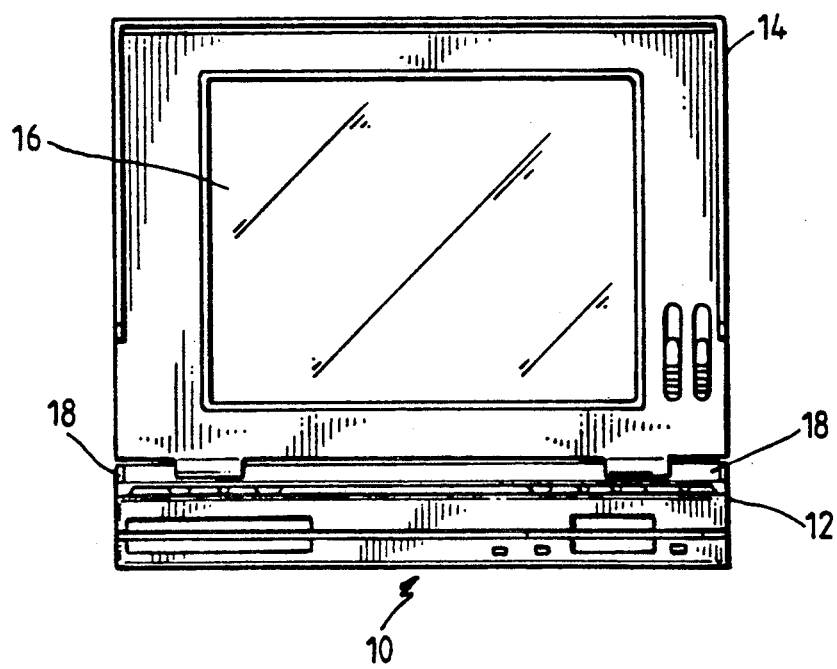
FIG. 2 is a front view of the laptop personal computer in FIG. 1.

One disadvantage noted with the COMPAQ LTE and COMPAQ LTE/286 personal computer systems 10 is their inability to control torque, during opening or closing of the cover unit 14 with respect to the base unit 12. As the cover unit 14 is moved from an open position (shown in FIGS. 1 and 2), in the direction shown by the bold arrow in FIG. 3, toward a closed position, prior art hinge means 18 have generally been unable to prevent their cover unit 14 from slamming against the base unit 12. It can be readily appreciated that such uncontrolled closure of the cover unit 14 with respect to the base unit 12 can lead to damage of the display subsystem 16. When such display subsystems 16 are relatively small, as is the case for the CGA display subsystems which are used in the COMPAQ LTE and COMPAQ LTE/286 personal computer systems 10, torque loadings on the hinge means 18 are typically inconsequential. However, when much larger display subsystems 16 (e.g., the VGA display subsystem utilized in the COMPAQ LTE 386s/20 personal computers also manufactured by the assignee of this invention) are incorporated into a cover unit 14, the torque loadings on the hinge means 18 can be quite large.

In accordance with one important aspect of this invention, the hinge means 18 includes a clutch spring 20 (FIG. 4) for controlling torque load while opening or closing of cover unit 14. Preferably, clutch spring 20 provides a two-toed clutching mechanism, by virtue of each distal end 22 of the clutch spring 20 contacting the clutch bracket 24 in respective detents 26. The clutch bracket 24 provides a clevis means for the hinge means 18. Greater or lesser torque from clutch spring 20 is possible by increasing or decreasing the number of turns that clutch spring 20 makes around clutch shaft or hinge pin 28. While many suitable spring materials may be used, so long as they provide sufficient torque for controlling opening/closing of cover unit 14, the preferred material is music wire having a square cross section as shown in FIG. 6. The clutch bracket 24 and the clutch shaft 28, both preferably made of Type 1010 steel, in conjunction with clutch spring 20 provide a dynamic torque (i.e., the average radial torque during full rotation of the cover unit 14, with respect to the base unit 12, in either a clockwise or counterclockwise direction) about 5.5 inch-pounds, plus or minus about 1.10 inch-pounds. Preferably, the clutch assembly comprising clutch spring 20, clutch bracket 24, and clutch shaft 28 also incur no more than 15 degrees of backlash. That is, there will be a maximum of 15 degrees free play before the clutch assembly comprising the clutch spring 20, clutch bracket 24, and clutch shaft 28 engages. Initial torque before dynamic torque, also known as static torque, preferably comprises approximately 5.5 inch-pounds, plus or minus 1.10 inch-pounds. Clutch bracket 24 and clutch shaft 28 as described thusfar generally comprise a means for rotatably coupling the cover unit 14 to the base unit 12, while the clutch spring 20 substantially comprises a torque control means for minimizing torque during opening and closing of such cover unit 14, with respect to the base unit 12.

As is well known, operations of a microcomputer subsystem (not shown) and display subsystem 16 can cause a phenomenon known as EMI (i.e., electromagnetic interference). Accordingly, prior art hinge means 18 have employed braided cable to conduct the EMI to a ground location typically the ground plane of the microcomputer subsystem. Such braided cable is heavy and susceptible to cracking when it has been repeatedly stressed; therefore, it would be desirable to avoid using such braided cable in laptop personal computer systems.

In accordance with another important aspect of this invention, the laptop personal computer system 10 further comprises means for suppressing EMI caused by operations of the microcomputer subsystem (not shown) and display subsystem 16. Preferably, such suppressing means 30 includes first conductor means 32 attached to the coupling means comprising the clutch bracket 24 and clutch shaft 28, thereby providing an electrically conductive path to a ground plane 34, and second conductor means 36, attached to the coupling means proximate to the torque control means comprising the clutch spring 20 and the clutch shaft 28 and coupled for cooperative contact with the torque control means to provide another electrically conductive path, such other electrically conductive path between the torque control means and the first conductive means 32.

First conductive means 32 as shown in FIGS. 4 and 5 preferably comprises a spring-form piece of conductive metal, with a plurality of tines 33 in tension between the clutch bracket 24 and the clutch shaft 28. The second conductive means 36 also comprises a spring-form piece of conductive metal attached to ground and to the first conductive means 32, such as by a metallic bolt 35. Both first and second conductive means 32, 36 preferably comprise beryllium-copper and even more preferably tin-plated beryllium-copper.

Alternatively, or in addition to such conductive means 32, 36, a conductive lubricant may be applied between clutch bracket 24 and clutch shaft 28 to provide the conductive path to ground for EMI. One such suitable conductive lubricant is "Conducto-Lube", a silver based lubricant having approximately 80% by weight silver, and made by the Cool-Amp Conducto-Lube Co. of Lake Oswego, Oreg. In those cases where such a conductive lubricant is employed, it is further preferable to employ a conductive plating at the surfaces where the lubricant is applied. Therefore, clutch spring 20, clutch bracket 24 and/or clutch shaft 28 may also be plated with tin, silver or any other suitably conductive plating.

Obviously, many modifications and variations of this invention are possible in light of all of the above teachings. It is to be understood, therefore, that within the scope of the appended claims this invention may be practiced otherwise than in the manner as is specifically recited herein.

We claim as our invention:

1. A laptop personal computer system, comprising:
   a) a base unit including a microcomputer subsystem;
   b) a cover unit including a display subsystem;
   c) hinge means coupling said cover unit to said base unit, said hinge means comprising:
      1) a clevis means attached to said base unit, said clevis means comprising two detents;
      2) a hinge pin attached to said cover unit, and coupled for rotation in said clevis means;
      3) a clutch spring mounted about said hinge pin to control torque from opening or closing said cover unit, said clutch spring being a two-toed clutch spring mounted about said hinge pin within said clevis means, wherein each distal end of said clutch spring is attached to said clevis means within said detents; and
   d) suppressive means cooperatively coupled to said hinge pin for suppressing electromagnetic interference in operations of said microcomputer subsystem.

2. The laptop personal computer system according to claim 1, wherein said microcomputer subsystem includes a ground plane.

3. The laptop personal computer system according to claim 2, wherein said suppressive means comprises:
   first conductive means electrically coupled between said clevis means and said hinge pin; and
   second conductive means electrically coupled between said ground plane and said clevis means.

4. The laptop personal computer system according to claim 3, wherein said suppressive means further comprises a conductive lubricant applied to said hinge pin between said hinge pin and said clevis means.

5. The laptop personal computer system according to claim 2, wherein said suppressive means comprises:
first conductive means electrically coupled between said clevis means and said hinge pin; and
second conductive means electrically coupled between said ground plane and said hinge means.

6. The laptop personal computer system according to claim 2, wherein said suppressive means comprises a conductive lubricant applied between said hinge pin and said clevis means.

7. A hinge for a personal computer with a base unit including a microcomputer having a ground plane and a cover unit with a display unit substantially encompassing the cover unit, said hinge comprising:
means for rotatably coupling the cover unit to the base unit, including a hinge pin;
clevis means attachable to said base unit, said clevis means comprising two detents;
torque control means for minimizing torque during opening and closing of the cover unit with respect to the base unit, said torque control means comprising a two-toed clutch spring mounted to said rotatably coupling means, wherein each distal end of said clutch spring is attached to said clevis means within said detents; and
means for suppressing electromagnetic interference caused by operations of the microcomputer and display unit, wherein said suppressing means includes first conductor means attached to said clevis means, for providing an electrically conductive path to the ground plane, and second conductor means, attached to said hinge pin proximate to said torque control means and coupled for cooperative contact with said clevis means so as to provide electrically conductive path between said clevis means and said first conductor means.

8. The hinge according to claim 7, wherein said first and second conductor means comprise a beryllium-copper spring.

9. The hinge according to claim 8, wherein said first and second conductor means further comprise a conductive plating.

10. The hinge according to claim 9, further comprising a conductive lubricant applied between said coupling means and said clevis means.

* * * * *